June 17, 1958   K. J. KNUDSEN   2,839,626
ADJUSTABLE METER CONTACT
Filed Sept. 21, 1955
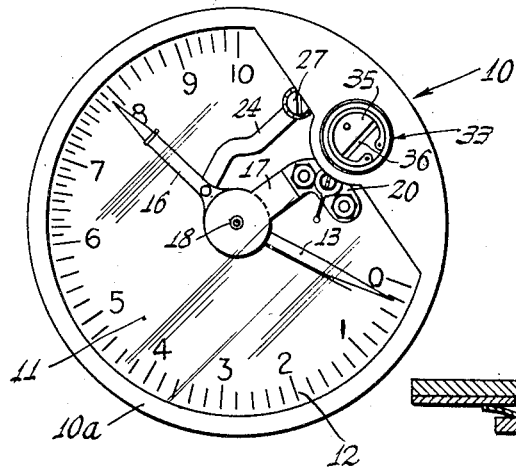
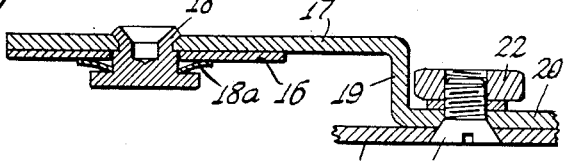
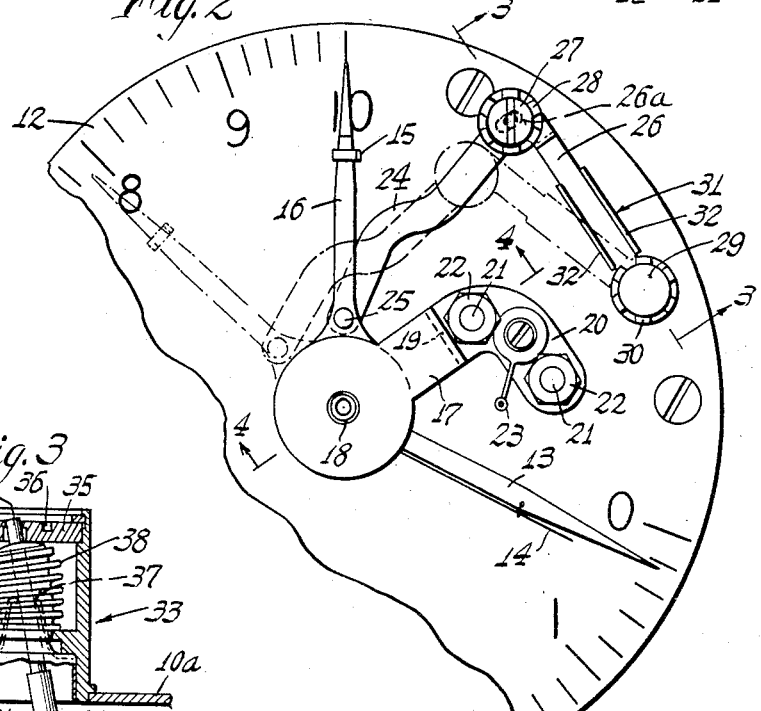
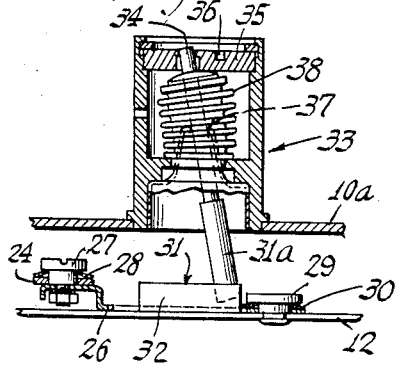
INVENTOR.
Knud J. Knudsen
BY
Johnson and Kline
ATTORNEYS

2,839,626

ADJUSTABLE METER CONTACT

Knud J. Knudsen, Woodbury, Conn., assignor to The Lewis Engineering Company, Naugatuck, Conn., a corporation of Connecticut Application September 21, 1955, Serial No. 535,689

5 Claims. (Cl. 200—56)

This invention relates to an instrument and more particularly to a contact adjustable within the path of an element of the instrument movement for electrical engagement with the element at a predetermined position thereof.

An object of this invention is to provide an instrument, having a movable pointer, with a settable contact which can be adjustably positioned at a location in a portion of the path of movement of the pointer and the location of the contact may be visible to an observer of the instrument.

Another object of my invention is to provide an instrument with a contact that can be adjusted to a desired position and in which the adjusting means is so constructed and arranged as to substantially prevent breakage of the contact even with careless, inapt manipulation thereof.

A further object of my invention is to provide in a sensitive instrument, one component of an electrical switch which is capable of being adjusted and set in the path of movement of the instrument pointer and in which the adjusting device is economical to fabricate, easy to assemble and disassemble, and is substantially carried by the instrument structure rather than the instrument casing.

Still yet a further object of my invention is to provide in a hermetically sealed sensitive instrument, an adjustable contact which may be controlled from the exterior of the meter and yet manipulation thereof does not break the sealing of the meter.

Heretofore, prior meters have been provided with an adjustable contact for engagement with a movable part of the instrument. The adjusting means consisted of a manually operable element on the exterior of the instrument directly connected to an arm carrying the contact so that movement of the element caused like movement of the arm. Frequently, through inaptness, negligence, etc., manipulation of the element caused the contact-carrying arm to be forced against end stops or other parts of the meter, causing breakage of the arm. A feature of this invention resides in the provision of a mechanism interconnecting the contact-carrying arm and the manually operable member which limits the movement of the arm to only a prescribed path, even with continued operation of the member.

Other features and advantages will hereinafter appear.

In the accompanying drawing:

Figure 1 is an elevation of a meter incorporating the present invention.

Fig. 2 is an enlarged view of a portion of Fig. 1 with the front meter casing removed.

Fig. 3 is a section taken on the line 3—3 of Fig. 2, and showing a portion of the instrument casing.

Fig. 4 is a section taken on the line 4—4 of Fig. 2.

Referring to the drawings, there is shown a meter, generally indicated by the reference numeral 10, having a casing 10a. The meter may be of a movable coil electrical type such as disclosed in Patent No. 2,586,831, granted to me on February 26, 1952.

The meter 10 has a transparent pane 11 and a scale 12. An indicator or pointer 13 is connected to the instrument movement for movement about the scale. The indicator 13 has attached thereto a platinum wire 14 forming one part of the switching device. The other component of the switching device consists of a contact 15 carried by a contact-carrying arm 16. The arm 16 is attached to a bracket 17 for pivotal movement as by a spun-over rivet 18. A star washer 18a is positioned between the rivet head and the arm 16 to create friction between the arm and the bracket. The bracket 17 has a transversely bent extending section 19 and a flat portion 20 to enable the arm 16 and bracket 17 to be spaced and separate from the indicator 13. The bracket 17 may be attached to the scale 12 as by screws 21 and nuts 22. An end stop 23 for the indicator 13 is also secured to the portion 20 of the bracket 17. A link 24 is connected to the arm 16 as at 25 and at its other end is connected to a lever 26. The lever 26 has an elongate slot 26a formed therein for permitting adjustment between the link 24 and the lever. While other securing means may be used, I prefer to employ a nut and bolt 27 and a star washer 28 to secure the link 24 and lever 26 together to facilitate adjustment therebetween. The lever 26 is connected to the scale 12 by a spun-over rivet 29. A star washer 30 is interposed between the rivet head and the lever 26. The lever 26, intermediate its length, is provided with a U-shaped channel 31 which may be formed by bending up side portions 32 of the lever.

To enable movement, for adjusting purposes, of the arm 16 from the exterior of the instrument without breaking the hermetic seal of the instrument, a sealed movement-transmitting device, generally indicated by the reference numeral 33, is provided. This device has a shaft 34. One end of the shaft 34 is received within the U-shaped channel 31, while the other end is positioned in an aperture formed in a rotatable member 35. The former end of the shaft 31 is enclosed by a nylon thimble 31a for insulation and for nylon-to-metal bearing surfaces. For facilitating rotation of the member 35, a slot 36 is provided on the exterior surface thereof. The shaft 34 is effectively fulcrumed at 37 in a bellows 38. The device 33 is more adequately set forth in Patent No. 2,697,356 granted to me on December 21, 1954.

The operation of the device is as follows:

To adjust the meter contact 15, a screwdriver bit or the like is inserted in the slot 36 to cause rotation of the element 35. By reason of the mounting of the shaft 34, the rotation of the member 35 causes the end of the shaft 34 positioned within the channel 31 to traverse a circular path. Accordingly, continued rotation of the member 35 in either direction will cause the lever 26 to oscillate about its pivot 29 which, through the link 24, will cause the contact-carrying arm 16 to oscillate about its pivot 18. By virtue of such an assemblage, breakage of the contact-carrying arm 16 by it hitting a stationary part of the meter, such as an end stop, caused by overturning of the manually operable member, is prevented. The position of the arm 16 is dependent solely on the angular position of the member 35 and not upon the number of revolutions that member 35 makes. Moreover, the positions which the arm 16 has for all angular positions of the member 35 is entirely free of any arm-breaking obstacles. The range of movement in the specific embodiment shown is substantially from the numeral 6 indication on the scale 12 to the numeral 10 indication. The elongate slot 26a permits the range to be shifted about the scale a slight amount. The electrical connection when the indicator 13 touches the contact 15 is through the wire 14, the contact 15, arm 16, bracket 17 and the scale 12. The scale 12, except for the circuit it is in, is insulated from the other portions of the meter. The nylon thimble insulates the scale 12 from the device 33. The star washers, 18a, 28 and 30 are provided to maintain or set the arm 16 in the adjusted position position by introducing friction into the linkage in addition to the inherent friction in the sealed movement-transmitting device 33.

Variations and modifications may be made within the scope of the claims and portions of the improvements may be used without others.

I claim:

1. In an instrument having an element movable along a path and forming part of an electrical switch, and a contact forming the other part of the electrical switch, the invention which comprises means for adjusting and setting said contact in the desired location in the path of movement of the element, said means including an arm carrying the contact, a rotatable member accessible from the exterior of the instrument, and linkage interconnecting the rotatable member and the arm so that rotation of the member in one direction causes oscillation of the arm.

2. In an instrument having a transparent member, a pivoted element movable along a circular path and forming part of an electrical switch, and a contact forming the other part of the electrical switch, the invention which comprises means for adjusting and setting said contact in the desired location in the path of movement of the element, said means including a pivoted arm carrying the contact and having its pivot aligned with the pivot of the element, both said arm and element being visible through the transparent member of the instrument, a rotatable member accessible from the exterior of the instrument, and linkage interconnecting the rotatable member and the arm so that rotation of the member in one direction causes oscillation of the arm.

3. In an instrument having an element movable along a path and forming part of an electrical switch, and a contact forming the other part of the electrical switch, the invention which comprises means for adjusting and setting said contact in the desired location in the path of movement of the element, said means including an arm carrying the contact, a lever pivoted at one end to the instrument and having a U-shaped slot formed therein intermediate its length, a link having its ends connected to the arm and lever, a shaft having an end portion disposed within the slot, and means accessible from the exterior of the instrument for causing the end portion of the shaft to traverse a circular path whereby the arm is caused to oscillate.

4. The invention as defined in claim 3 in which means are provided at the pivots of the arm and lever for exerting a frictional force for maintaining the arm in an adjusted position.

5. A switching device for use with an instrument having an element movable about a scale and forming one part of an electrical switch, comprising a contact forming the other part of the switch and adapted for electrical engagement with the element, an arm pivoted at one end to the instrument and carrying the contact, a lever pivoted at one end to the instrument, a link interconnecting the arm and lever, a channel formed in the lever, a shaft having one end positioned within the channel, and rotatable means accessible from the exterior of the instrument for causing the end of the shaft to traverse a circular path whereby rotation of the shaft causes oscillation of the arm.

References Cited in the file of this patent

UNITED STATES PATENTS

| | | |
|---|---|---|
| 2,229,592 | Rosenfeld | Jan. 21, 1941 |
| 2,246,047 | Jackson | June 17, 1941 |
| 2,251,475 | Walker | Aug. 5, 1941 |
| 2,697,356 | Knudsen | Dec. 21, 1954 |